(12) United States Patent
Maruyama (10) Patent No.: US 6,276,419 B1
(45) Date of Patent: Aug. 21, 2001

(54) SEALING APPARATUS (75) Inventor: Shigenori Maruyama, Amagasaki (JP)

(73) Assignee: Fuji Impulse Co., Ltd. (JP)

( * ) Notice: Subject to any disclaimer, the term of this patent is extended or adjusted under 35 U.S.C. 154(b) by 0 days.

(21) Appl. No.: 09/351,954

(22) Filed: Jul. 12, 1999

(51) Int. Cl.[7] .................................................. B30B 15/00
(52) U.S. Cl. ...................... 156/358; 156/359; 156/583.1; 156/583.8; 100/50; 100/319
(58) Field of Search ................... 156/358, 359, 156/498, 583.1, 583.8, 583.9; 100/50, 51, 319, 320, 326, 233

(56) References Cited

U.S. PATENT DOCUMENTS 3,375,777 * 4/1968 Techtmann et al. ................. 100/326
5,322,586 * 6/1994 McLean ............................... 156/358
5,352,323 * 10/1994 Chi .................................... 156/583.9
5,458,730 * 10/1995 Soodak ................................ 156/579

FOREIGN PATENT DOCUMENTS 55170207    5/1954  (JP) .

* cited by examiner

*Primary Examiner*—James Sells
(74) *Attorney, Agent, or Firm*—Webb Ziesenheim Logsdon Orkin & Hanson, P.C.

(57) ABSTRACT

A sealing apparatus includes a base having a fixed jaw, a press lever having a movable jaw and pivotally supported on the base, a posture changing mechanism for pressing the press lever toward the base, and a heater for heating material to be sealed clamped between the pair of jaws. A monitor mechanism is provided for measuring the load applied between the pair of jaws at any selected point in the course of a pivotal stroke of the press lever. The monitor mechanism includes a monitor portion deformable in accordance with a press applied to the press lever from the posture changing mechanism and a sensor for detecting the load based on the amount of deformation of the monitor portion.

17 Claims, 4 Drawing Sheets

| NO | heating temperature | cooling temperature | sealing pressure |
|---|---|---|---|
| 1 | 160 | 80 | 105 |
| 2 | 158 | 81 | 104 |
| 3 | 159 | 79 | 105 |
| 4 | 160 | 80 | 103 |

SEALING APPARATUS

FIELD OF THE INVENTION

The present invention relates to a sealing apparatus, more particular to a sealing apparatus including a pair of jaws which are movable relative to each other between a first state in which the jaws are moved away from each other to receive material to be sealed therebetween and a second state in which the jaws are moved toward each other to damp the material therebetween, a press mechanism for pressing the pair of jaws against each other, and a heating means for heating the material clamped between the jaws.

DESCRIPTION OF THE RELATED ART

Figure 5:
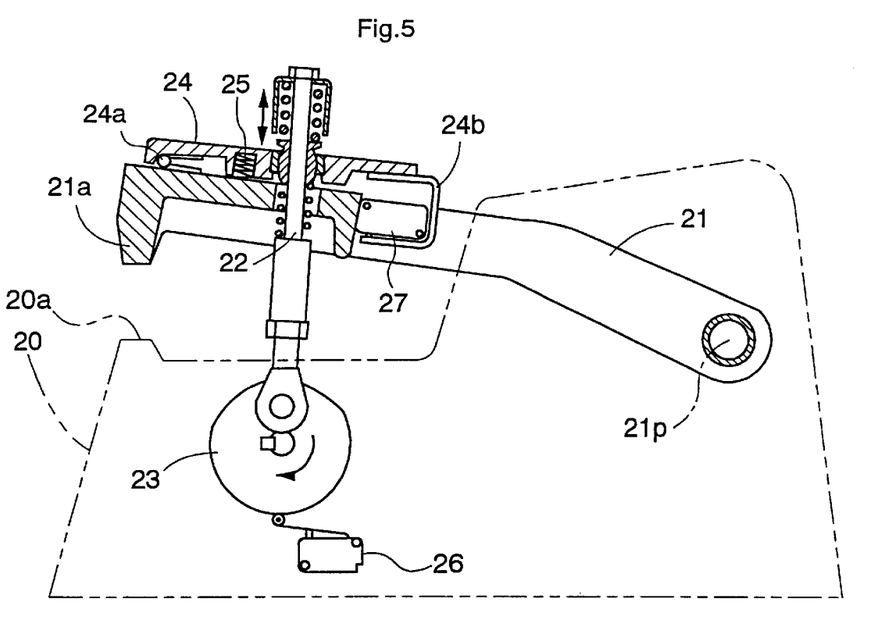
FIG. 5 is a side view showing a conventional sealing apparatus.

A sealing apparatus of the above-noted type is known from e.g. a Japanese laid-open utility model gazette No. Sho. 55-170207 sharing the same applicant as the present application. As shown in FIG. 5, this sealing apparatus includes a base 20 having a fixed jaw 20a and a press lever 21 pivotally supported on the base member 20 via a pin 21p, the press lever 21 having a movable jaw 21a. Further, a draw shaft 22 inserted into a through hole defined in the press lever 21 and a cam plate 23 rotatably supported to the base 20 together constitute a press mechanism. The lower end of the draw shaft 22 is coupled with a portion of a side face of the cam plate 23. The press mechanism pivots the press lever 21 from a first posture in which the movable jaw 21a is placed away from the fixed jaw 20a to a second posture in which the movable jaw 21a is pressed against the fixed jaw 20a. On the top of the press lever 21, a displacement detecting plate 24 is pivotally mounted via a hinge 24a, with the plate 24 being urged upward by a coil spring 25. Via this displacement detecting plate 24, the upper end of the draw shaft 22 is coupled with the press lever 21. When the cam plate 23 is rotatably driven by a motor, the draw shaft 22 is lowered thereby to press the movable jaw 21a against the fixed jaw 20a. On the other hand, the base 20 mounts thereon a microswitch 26 capable of detecting switchover of the posture of the press lever 21 based on the rotary displacement of the peripheral face of the cam plate 23. If a foreign material or object thicker than the material to be sealed happens to be clamped between the movable jaw 21a and the fixed jaw 20a during a sealing operation, an upward external force is applied to the movable jaw 21a before the press lever 21 reaches the second posture, and the displacement detecting plate 24 is "pivoted" toward the press lever 21 overwhelming the urging force of the coil spring 25, so that an angle 24b attached to the displacement detecting plate 24 acts upon the microswitch 27 on the press lever 21. With this, the presence of the foreign material may be detected.

However, the sealing apparatus of the above-described conventional construction is capable of detecting the upward external force applied to the movable jaw 21a only when such external force lowers the displacement detecting plate 24 by overwhelming the urging force of the coil spring 25. In other words, the construction is adapted only for judging whether the external force exceeds the predetermined urging force of the coil spring 25 or not.

Therefore, the stress detecting mechanism provided in the conventional sealing apparatus does not provide the function of continuously monitoring the pressing force applied to the sealing material from the fixed jaw and the movable jaw.

In view of the above, the primary material of the present invention is to provide a sealing apparatus which provides the function of allowing continuous monitoring of the pressing force applied from the fixed jaw and the movable jaw to the sealing material.

Another object of the invention is to provide a sealing apparatus capable of invariably measuring/outputting an accurate sealing pressure regardless of the thickness of the material to be sealed, thus recording in each sealed product whether an appropriate sealing pressure within a predetermined permissible range has been applied to the product at the time of the sealing operation (heat-fusing operation) thereof based on the outputted pressure.

SUMMARY OF THE INVENTION

For accomplishing the above-noted material, a sealing apparatus according to the present invention comprises:

a base having a fixed jaw;

a press lever pivotally supported on the base, the press lever having a movable jaw and being movable between a first state in which the movable jaw is located away from the fixed jaw to receive a material to be sealed therebetween and a second state in which the movable jaw is moved toward the fixed jaw to damp the material therebetween;

a press mechanism for pressing the movable jaw against the fixed jaw by applying a stress to the press lever toward the base;

means for heating the material pressed between the fixed jaw and the movable jaw by the press mechanism; and means for measuring the load applied between the fixed jaw and the movable jaw at any selected point in the course of transition from the first state to the second state, the load measuring means including a monitor portion mounted on the press lever to be deformable by the stress applied to the press lever from the press mechanism and means for determining the load based on the amount of the deformation of the monitor portion.

According to the sealing apparatus of the invention having the above-described construction, any pressing force applied to the sealing material from the fixed jaw and the movable jaw may be continuously monitored via the monitor portion. Further, such continuous monitoring of any pressing force is possible not only when the fixed jaw and the movable jaw are located close to each other in order to seal the material, but also when the jaws are still wide open for allowing reception of the material therebetween. Thus, the monitor portion may be utilized also for detecting any foreign material which may be inadvertently present between the movable jaw and the fixed jaw.

According to one embodiment of the present invention, the monitor portion includes a pressure plate fixedly mounted on the press lever and a strain gauge affixed to the pressure plate; and the press mechanism draws the press lever via the pressure plate toward the base, so that the resulting load applied to the movable jaw causes corresponding deformation in the pressure plate, which deformation in turn applies a tensile or compressive force to the strain gauge.

The above-described construction provides the advantage of allowing reasonable selection of appropriate different materials for forming the pressure plate and the press lever, respectively. For instance, the pressure plate may be formed of material such as steel which is readily available and which readily provides requisite dimensional accuracy and stable elastic modulus, while the press lever per se may be formed of such material as cast iron which is low cost yet provides a high rigidity. As a result, a highly reliable monitor portion may be provided at relatively low costs. Further, if the monitor portion is constructed by affixing a strain gauge to such pressure plate as above, a calibration operation, when needed, between the output of the affixed strain gauge and the value of load corresponding thereto may be conducted handily to the small pressure plate alone. And, this may be readily affixed to the press lever after completion of the calibration operation.

Preferably, the press lever includes a support portion for supporting the pressure plate and a gap is provided between the press lever and the pressure plate for allowing the deformation of the pressure plate. With this construction, the load applied to the movable jaw and the deformation amount of the pressure plate may be less affected by other components such as the press lever, so that a desirable linear relationship may be readily obtained between the load and the deformation amount. As the result, more accurate measurement of the load becomes possible. Further, by providing such gap or recess, it becomes possible to attach the strain gauges to both the upper surface and lower surface of the pressure plate, thus enabling even more accurate measurement.

Preferably, the apparatus further comprises an emergency stop mechanism for stopping the change of the posture if the load measuring means detects a value of load exceeding a first predetermined load value during the transition from the first state to the second state. With this construction, it is possible to detect a foreign material if present between the fixed jaw and the movable jaw as early as possible in the course of a sealing operation.

Preferably, the apparatus further comprises damping-force judging mean for driving the heating means when the load measuring means detects a load value exceeding a second predetermined load value.

With the above construction, it is possible to prevent the temperature of the one jaw mounting the heating means from increasing unnecessarily, so that it becomes possible to advance the timing of releasing the sealed material by pivoting the press lever upward after completion of fusing operation of the material (as described later, in order to obtain reliable sealing and to obtain also fused material surface superior in the aesthetic appearance, the contact between the two jaws and the material needs to be maintained awhile after completion of the fusing operation until the temperature adjacent the contacting surfaces of the material to the fixed and movable jaws drops to a predetermined temperature. If the driving of the heating means is initiated before the jaws clamp a new material therebetween by a predetermined pressure, this may cause accumulation of excess heat at least in the jaw mounting the heating means, thus resulting in disadvantageous increase in the time period required for cooling of the jaw after completion of fusing operation.) Further, with the above feature, the heating means will be driven for a short time period necessary and sufficient for the heat-fusing sealing operation, so that there may be obtained a further advantage of reduction of the power consumption.

Still preferably, the apparatus further comprises a posture judging switch operable in response to switchover of the press lever to the second state. In this case, the posture switchover operation may be suspended if the time period required for this switch to be operated after the press mechanism, as the posture switchover means, has initiated posture switchover of the press lever has exceeded a predetermined time period. With this arrangement, it becomes possible to suspend the apparatus operation even if the emergency stop mechanism should become inoperable.

Still preferably, the apparatus further comprises a temperature detecting means attached to at least one of the fixed jaw and movable jaw for detecting the temperature of the material and a cooling judging means for returning the press lever to the first state when the temperature detecting means detects a temperature below a predetermined temperature after the driving of the heating means is stopped. With this construction, the press lever will be moved away from the material after the material has been cooled sufficiently to provide requisite strength. Hence, it becomes possible to avoid such inconvenience that the press lever is detached from the still soft material with a portion of the material being removed by the lever with the material portion being adhered thereto. As a result, this construction can assure reliable sealing condition and sealed surface with superior aesthetic appearance.

Still preferably, the apparatus further comprises means for varying the second predetermined load value (i.e. the reference press force at which the driving of the heating means is to be initiated). With this construction, it becomes possible to appropriately adjust the pressure to be applied to the material to be sealed, depending on its properties (thickness, softening degree in the heating, etc.). Thus, this construction too will contribute to improvement of reliability of the seal.

According to a further aspect of the present invention, there is provided a sealing apparatus comprising:
  a pair of jaws movable between a first state in which the jaws are located away from each other to receive an material to be sealed therebetween and a second state in which the jaws are moved toward each other to clamp the material therebetween;
  a press mechanism for pressing the jaws against each other;
  means for heating the material pressed between the jaws by the press mechanism;
  means for measuring the load applied between the pair of jaws at any selected point in the course of transition from the first state to the second state; and
  data transfer means for transferring the measured load value at the time of sealing.

With the sealing apparatus of the invention having the above-described construction, the load applied to the pair of jaws may be measured during the transition from the first state to the second state. Hence, the measurement of the load is possible regardless also of the thickness of the material. As a result, no re-adjustment of the apparatus is needed to cope with any variation in the thickness thereof. Further, as the transferred measured load value accurately shows the pressure actually applied to the material at the time of sealing thereof. Then, this transferred measured load value may be advantageously recorded in each sealed product if an appropriate pressure within the predetermined permissible range has been applied to the product at the time of sealing (heat-fusing) operation thereof.

Preferably, the above apparatus further comprises:
  data processing means for processing the measured load value transferred from said data transfer means; and
  outputting means for outputting the measured load value processed by said data transfer means as a sealing pressure applied to the material at the time of sealing thereof.

With the above, the quality maintenance of the sealing operation may be facilitated. Further, a user or consumer of the seal product may judge visually confirm, e.g. immediately before taking the product out of the sealed wrapping, whether the product was sealed with an appropriate sealing pressure, i.e. the sealed condition, with reference to the output result recorded thereon. This will prove particularly advantageous in case the product comprises food stuff, a medical product, a surgical instrument or the like, since the possibility of confirming the sealed condition (sealing performance) at the time of packaging thereof provides useful information in deciding how the product taken out of the package should be handled.

Still preferably, said outputting means prints the measured load value on the surface of the material used in the sealing. With this, when a product is packaged and sealed within the material, the outputting (printing) operation of the measured load value on the material may be effected simultaneously with the sealing operation, i.e. while the product is being set on the sealing apparatus. As a result, this may be effective for precluding error in the one-to-one correspondence between the sealed product and the outputted value. Also, the user who takes out the product from the sealed package may simply check the output value recorded on the wrapping of the product per se, without the need of troublesome checking operation between the product with reference to a separate document or the like.

Still preferably, said outputting means outputs a measured load value out of a predetermined permissible range in a different manner than a measured load value within said predetermined permissible range. With this feature, it becomes possible to readily distinguish any product sealed under inappropriate sealing condition as a defective product from others.

In this case, said outputting means may print the measured value out of the predetermined range in a different color than the measure load value within the predetermined permissible range.

Still preferably, the sealing apparatus further comprises:
temperature detecting means attached to at least one of said pair of jaws for detecting the temperature of the material;
cooling judging means for returning the pair of jaws to the first state when the temperature detecting means detects a temperature below a predetermined temperature after the driving of the heating means is stopped; and
said outputting means outputs said detected temperature value at the time of returning the jaws, independently of the measured load value.

With this construction, the quality control manager or user may grasp the sealed condition with even higher accuracy.

Further and other materials of the invention will become apparent from the following detailed description of the preferred embodiments thereof with reference to the accompanying drawings.

DESCRIPTION OF THE PREFERRED EMBODIMENTS

A preferred embodiment of a sealing apparatus relating to the present invention will be described next with reference to the accompanying drawings. It is understood that the following description is only illustrative, not limiting the scope of the invention which is defined in the appended claims.

(Construction of Sealing Apparatus)

Figure 2:
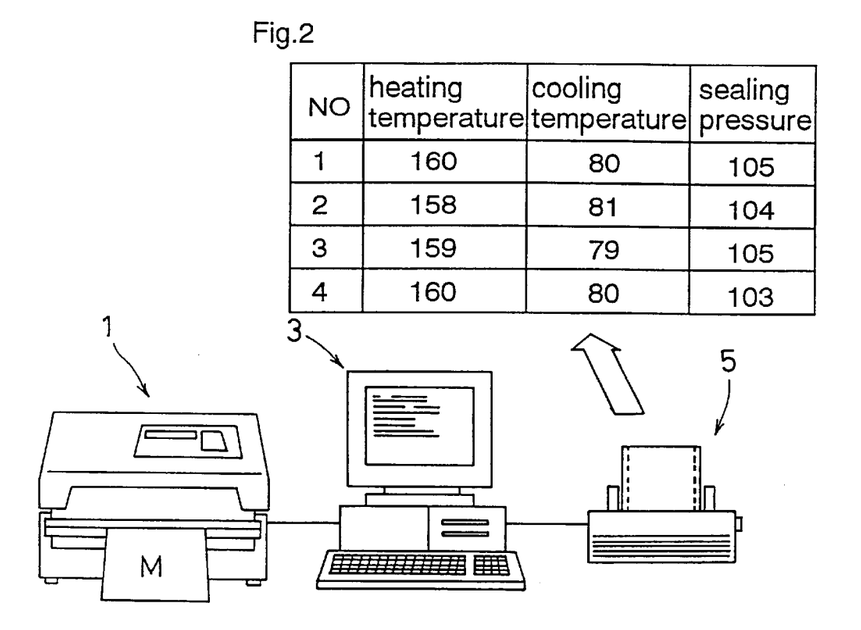
FIG. 2 is a front view showing an entire sealing apparatus according to the invention.

A sealing apparatus shown in its entirety in FIG. 2 includes a sealing apparatus body 1, a computer 3 for processing sealing data, and a printer 5 for obtaining printouts of the processed sealing data. The sealing apparatus body 1 incorporates a data transmitting means.

Figure 1A:
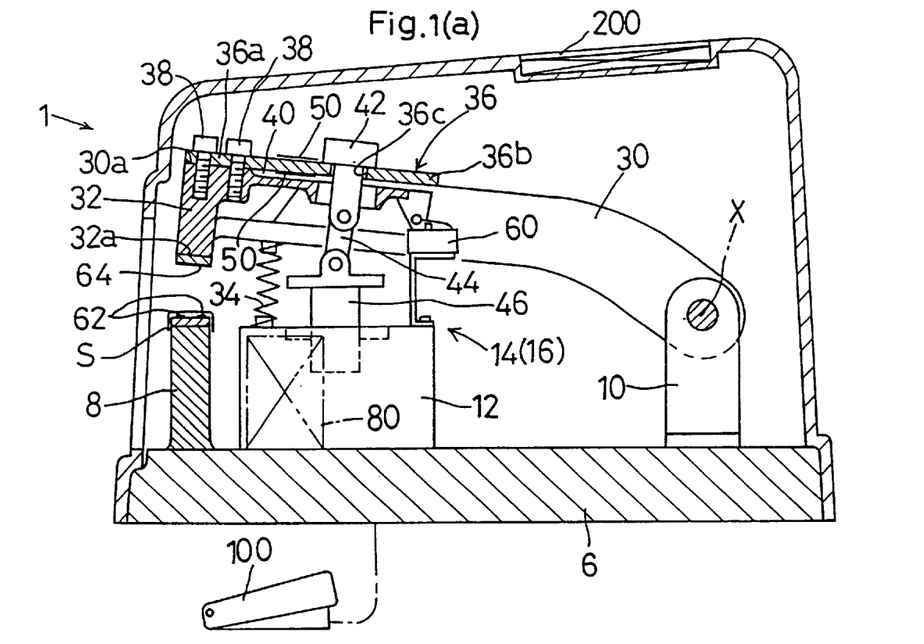
FIGS. 1a and 1b are side views showing respectively a first state and a second state of a sealing apparatus body relating to the present invention.
Figure 1B:
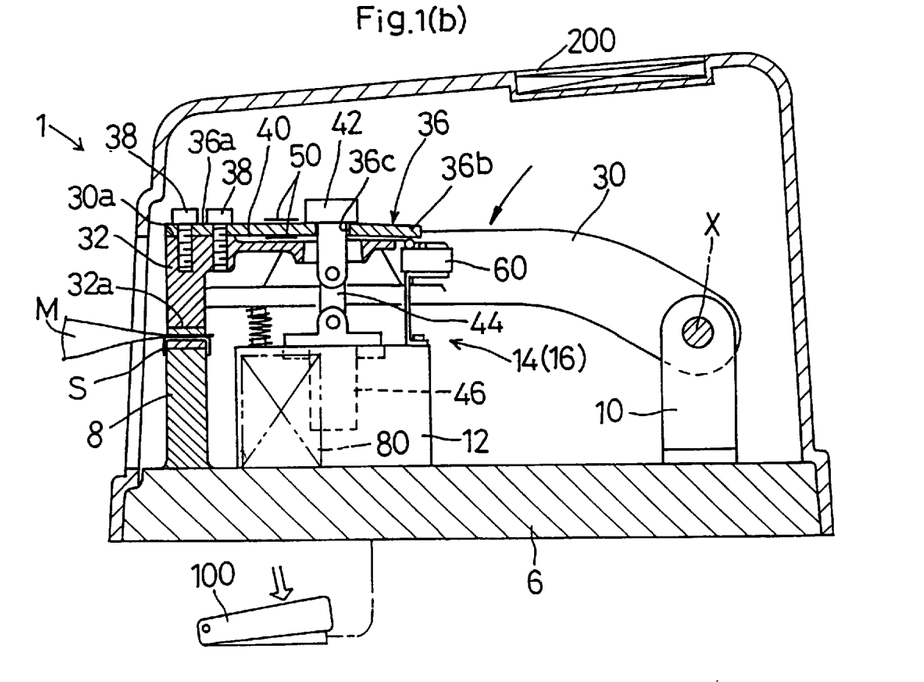

Referring to FIG. 1, the sealing apparatus body 1 includes a base 6 having a fixed jaw 8, and a pair of right and left press levers 30, 30 mounted on the base 6 to be vertically pivotable relative thereto. The base end portions of the press lever 30, 30 are bent downward to be supported via pins by a pair of supports 10, 10 erected on the base 6 to be pivotable about an axis X. The press levers 30, 30 mount, at the respective distal or free ends thereof, a movable jaw 32 having a length in the right and left direction (i.e. the direction extending in the depth direction of the figure) and projecting downward from the distal ends of the levers. A rubber pad 32a is fixed to the bottom end of the movable jaw 32. In operation, in association with the pivotal movement of the press levers 30, 30, the movable jaw 32 is moved toward the fixed jaw 8, whereby the pad 32a comes into contact with the fixed jaw 8 (see FIG. 2).

On the top of the distal end of the press levers 30, there is attached a pressure plate 36 as a "load measuring means". This pressure plate 36 comprises a steel plate of about 5 mm thickness. The pressure plate 36 includes a supported portion 36a and a flexing portion 36b extending rearward therefrom. The supported portion 36a is fixed by means of bolts 38, 38 to a supporting portion 30a provided upwardly of the movable jaw 32. The movable jaw 32 defines, at a portion thereof disposed under the flexing portion 36b, a recess 40 for allowing or accommodating downward deformation of the flexing portion 36b. In other words, the pressure plate 36 is supported cantilever-wise at the supported portion 36a provided at the front end thereof.

A posture changing mechanism 14 is provided for changing the posture of the press levers 30, 30 relative to the base 6. This posture changing mechanism 14 includes a solenoid 12 secured to the base 6, a movable iron core 46 which is displaced relative to the solenoid 12 for varying the length of insertion of the core 46 into the sheath of the solenoid 12, a lowering head 42 fitted within a through hole 36c defined in the flexing portion 36b of the pressure plate 36, a link element 44 for coupling the lowering head 42 with the movable iron core 36c, and a return spring 34 for urging the press levers 30, 30 toward the posture thereof away from the base 6. In operation, when the solenoid 12 is supplied with an electric current of an appropriate magnitude, a magnetic force is induced to pull the movable iron core 46 toward the solenoid 12, so that via the link element 44 and the pressure plate 36, the press levers 30, 30 are pulled downward overwhelming the urging force of the return spring 34 (in this, the lowering head 42 and the link element 44 together function as an example of a "pressure transmitting member" for pulling the press levers 30, 30 toward the base 6 via the pressure plate 36). Accordingly, by varying the electric current supplied to the solenoid 12, the posture of the press levers 30, 30 may be changed over between a first posture (FIG. 1-a) in which the press levers 30, 30 are wide open to allow introduction of material M to be sealed between the fixed jaw 8 and the movable jaw 32 and a second posture (FIG. 1-b) in which the movable jaw 32 is moved toward the fixed jaw 8 to clamp the material M therebetween.

Incidentally, the material M comprises a material which can be heat-fused in the form of a bag or an envelope having one end open for allowing introduction of an object therein.

The above-described posture changing mechanism 14 acts also as a press mechanism 16 for progressively pressing the movable jaw 32 against the fixed jaw 8. More particularly, by further increasing the electric current to the solenoid 12, the movable jaw 32 is progressively pressed against the fixed jaw 8 to press the material M between the pair of jaws 8, 32. On the other hand, the sealing apparatus body 1 includes a foot switch 100 for activating the posture changing mechanism 14.

On the top end face of the fixed jaw 8, nichrome tapes 62, 62 (an example of "heating means") are affixed. These nichrome tapes 62, 62, provided in a pair, are disposed in parallel with each other with a 2 mm gap therebetween. A sealing operation with this arrangement of nichrome tapes 62, 62 will provide two elongate band-like sealed portions each having a width of about 4 mm. Such band-like sealing of about 4 mm width provides the advantage of greater ease of removal thereof in comparison with a similar sealing obtained when using a single nichrome tape having a width of about 10 mm. Moreover, since the band-like seals of about 4 mm width are provided at two positions spaced apart from each other, the reliability of the sealing does not deteriorate. Also, with such sealing method as above, especially when a resin sheet and a paper sheet are sealed together with an adhesive sheet made of a thermoplastic resin, generation of paper dust from the paper sheet may be restricted advantageously.

When the nichrome tapes 62, 62 are driven (i.e. charged with electricity), the material M pressed between the fixed jaw 8 and the movable jaw 32 may be heated. Incidentally, between the fixed jaw made of metal thus having electro-conductivity and the nichrome tapes 62, 62 there is interposed a thin Teflon™ (trademark owned by Du Pont Co., Ltd. in the U.S.A.) sheet so as to avoid short-circuit of the current conducted through the nichrome tapes 62, 62. Further, in an actual sealing operation, this operation will be conducted with placing a thin heat-resistant sheet S made of Teflon™ or the like also on the nichrome tapes 62, 62, so as to prevent the tapes 62, 62 from contacting the material M.

The base 6 further mounts a pair of cooling fans 80, 80 for forcibly cooling the fixed jaw 8.

On the upper and lower sides of the pressure plates 36, strain gauges 50, 50 (an example of "load measuring means") are respectively affixed. When load is applied to the movable jaw 32, this causes deformation in the pressure plate 36 acting as the load measuring means, which deformation of the pressure plate 36 in turn applies a tensile or compressive force to the strain gauges 50, 50. The force causes change in the electric resistance of the gauges, which change is then converted into an electric voltage signal through an amplifier circuit comprised of a bridge circuit and this signal is then A/D-converted, so that the magnitude of the load P1 being applied to the movable jaw 32 may be determined.

In the above, since the pressure plate 36 acting as the load measuring means is disposed between the pivot axis X of the press levers 30, 30 and the movable jaw 32, the load P1 applied to the movable jaw 32 may be detected, regardless of the relative position of the movable jaw 32 with respect to the fixed jaw 8 (that is, the detection is possible not only under the second state, but also at an arbitrarily selected point in the course of transition from the first state to the second state).

Further, between the press levers 30, 30 and the base 6, there is provided a microswitch 60. As shown in FIG. 1-b, this microswitch 60 is turned ON when the press levers 30, 30 are lowered to move the movable jaw 32 toward the fixed jaw 8 to clamp the material M therebetween, thereby to generate a signal for initiating the heating step.

The rubber pad 32a of the movable jaw 32 incorporates therein a thermocouple 64 (an example of "temperature detecting means").

(Control Mechanism)

Figure 3:
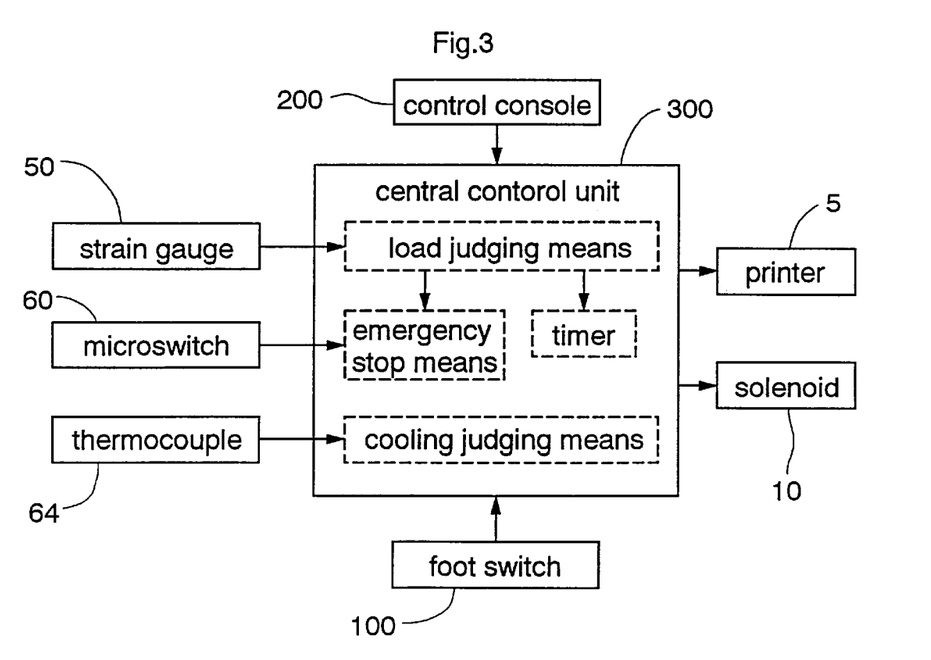
FIG. 3 is a block diagram of a control unit incorporated in the sealing apparatus body of FIG. 1.

As shown in FIG. 3, the control mechanism incorporated in the sealing apparatus of the invention includes a console panel 200 mounted on a cover of the sealing apparatus body 1, and a central control unit 300 disposed on the base 6. The central control unit 300 includes a load judging means, an emergency stop means, a cooling judging means, and a timer. This central control unit 300 is connected with the console panel 200, the foot switch 100, the printer 5, the solenoid 10, the strain gauges 50, the microswitch 60 and with the thermocouple 64.

The central control unit 300 executes a series of basic operations including the steps of lowering the press levers 30, 30 in response to a push operation on the foot switch 100, starting supply of the electricity to the solenoid 12 for clamping the material between the movable jaw 32 and the fixed jaw 8, and progressively increasing the electricity to the solenoid. In addition, in the course of these basic operation steps, the central control unit 300 is capable of effecting the following operations as well.

Namely, the load judging means compares the value P1 of load being currently applied to the movable jaw 32 and measured by the load measuring means 36, 50 to a first predetermined load value or a second predetermined load value. Here, the first predetermined load value is a reference value based on which the posture changing operation of the press levers 30, 30 is immediately suspended in the case of an emergency so determined if the load resisting the mutually approaching movement between the pair of jaws has exceeded this predetermined value. Therefore, this value may be set at such a value which is slightly greater than the necessary and sufficient force for the posture changing mechanism 14 to cause the press levers 30, 30 to be deformed toward the base 6 against the urging force of the return spring 34. In the instant embodiment, the value is set at 5 kg. On the other hand, the second predetermined load value is a reference value suitable for heat-fusing the material M to be sealed. Hence, this value may vary depending on the properties of the material employed. In the instant embodiment, it is set at the typical value of 100 kg for example.

The emergency stop means immediately suspends the posture changing operation of the press levers 30, 30 in the course of its transition from the first state to the second state, i.e. when the levers have not yet been lowered enough to bring the movable jaw 32 toward the fixed jaw 8 for clamping the material M therebetween. More particularly, when the microswitch 60 is OFF and if, under this condition, the strain gauges 50, 50 detect a value P1 greater than the first predetermined load value, this emergency stop means determines this as an "emergency" and immediately suspends the posture changing operation. With his, the press levers 30, 30 are returned to the first state by the urging force of the return spring 34.

The cooling judging means deenergizes the solenoid 12 to return the press levers 30, 30 to the first state if the thermocouple 64 detects a temperature value V1 lower than a predetermined temperature value T0 (e.g. 90° C.) after the supply of electricity to the nichrome tapes 62, 62 is stopped.

The timer provides the function of determining the time period lapsed after the initiation of the lowering operation of the press levers 30, 30 by the solenoid drive mechanism and then comparing this time period with a reference lowering time period (e.g. 2 seconds).

(Data Outputting Mechanism)

The apparatus body 1 includes an interface based on RS-232C for allowing transfer of data obtained by the load measuring means or the thermocouple 64 to the computer 3.

Further, the printer 5 outputs (prints) these data processed by the computer 3 in the form of a print.

In this respect, the data printing operation to the material and the print paper may be effected in such a manner that those data within a predetermined permissible range set in advance from a control/display unit 70 may be printed in black, otherwise, i.e. the data out of the range may be printed in any different color such as red which can readily rouse the quality control manager or user's attention.

(Control Method)

Figure 4:
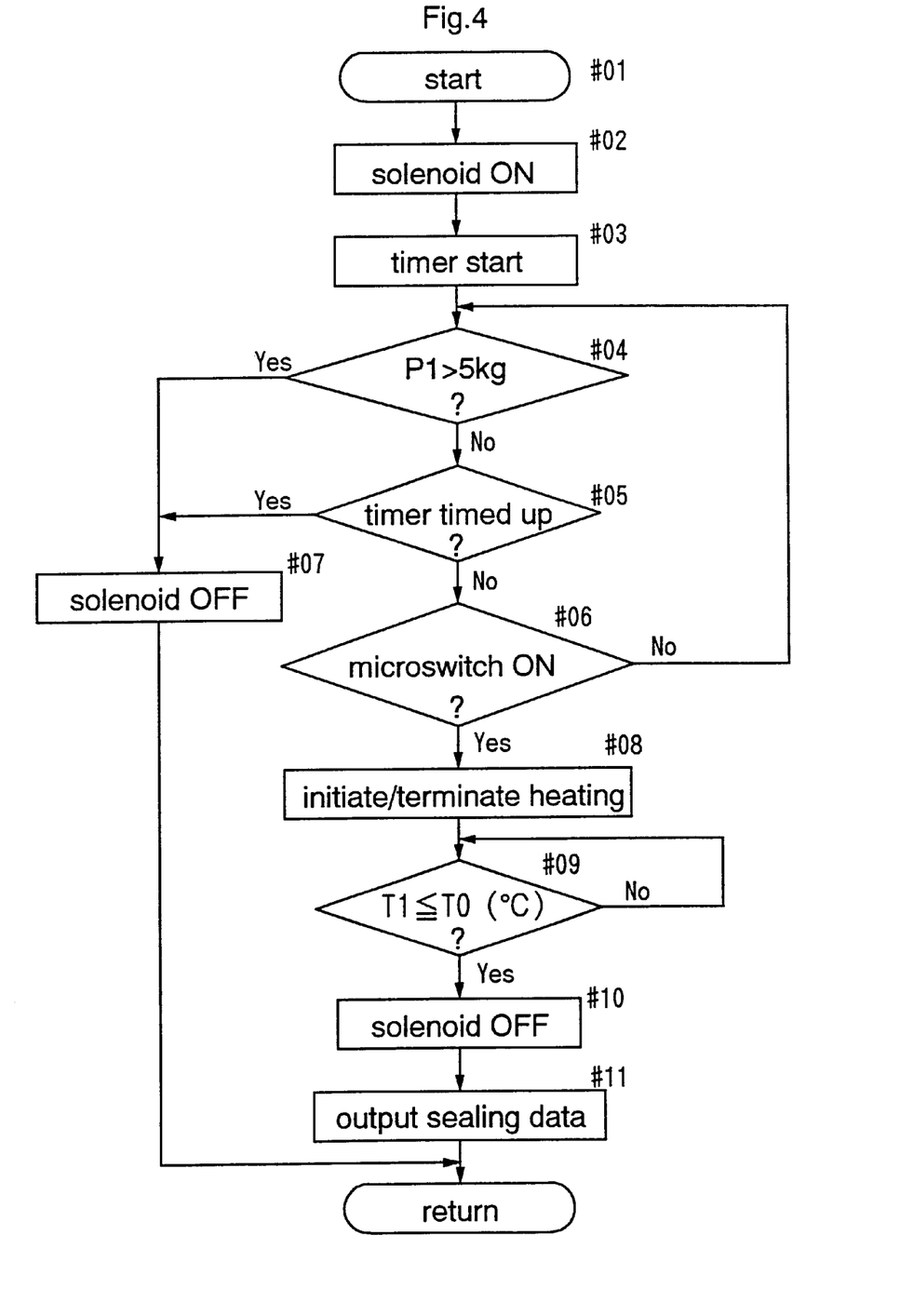
FIG. 4 is a flow chart illustrating a control scheme built in the control unit of the sealing apparatus body of FIG. 1.

Next, the control scheme incorporated in the above-described sealing apparatus of the present invention will be described with reference to the flowchart of FIG. 4.

(1) After setting the material M (an example of "sealing material") to be sealed between the movable jaw 32 and the fixed jaw 8, the operator steps on the foot switch 100 (#01). With this, the electricity is supplied to the solenoid 12, so that the movable iron core 46 is pulled downward by the induced magnetic force, thus starting the lowering operation of the press levers 30, 30 (#02). At this point simultaneously, the timer starts measuring the lapsed time period (#03).

(2) If the load judging means determines that the load P1 exceeding the first predetermined load value (5 kg) has been detected before the press levers 30, 30 are sufficiently lowered ('YES' at #04) or if the timer has timed up before that (in the case of 'YES' at #05), the solenoid 12 is deenergized (#07), so that the press levers 30, 30 are returned to the first posture under the urging force of the return (compression) spring 34.

(3) If the load P1 exceeding the first predetermined load value (5 kg) is not detected before the timer times up ('NO' at #05), the electric current to the solenoid 12 is progressively increased, until the press levers 30, 30 are lowered by the sufficient distance to eventually turn ON the microswitch 60 ('YES' at #06).

(4) In response to the signal generated upon the turning ON of the microswitch 60, the nichrome tapes 62, 62 are driven to heat the material M. Then, upon lapse of the predetermined period, the heating operation is terminated (#08).

(5) When the temperature T1 of the material measured by the thermocouple 64 has dropped to the predetermined temperature T0 ('YES' at #09), the solenoid 12 is deenergized (#10), thus completing the heat-fusing sealing operation.

(6) The peak value of the heating temperature, the temperature T1 of the material when detached from the movable jaw 32 and the measured load value P1 at the time of initiation of heating are transmitted, respectively as "heating temperature", "cooling temperature" and "sealing pressure", via an interface to the personal computer 3. After data processing by the personal computer 3, these measurement values are transmitted to be printed on the surface of the of the sealed product M and to be separately printed on a recording paper to be discharged from the printer 5 and to be outputted on a display section of the control console 200 (#11).

The second predetermined load value as the reference load for heat-fusing together a plurality of layers of sealing material M clamped between the pair of jaws 8, 32 may be varied, if necessary (depending on the properties of the material to be sealed such as the softening property, thickness and so on), from the control console 200.

Next, other embodiments of the invention will be described

It is possible to cause the timing of initiating the heating step to be dependent not on the ON of the microswitch 60, but on the determination by the load judging means that the load applied to the movable jaw 32 has exceeded the second predetermined load value. In this case, it is conceivable to adapt the microswitch 60 to be turned ON prior to the judgement made by the load judging means.

Further, the second predetermined load value may be key-locked. That is, in order to avoid inadvertent change of the second predetermined load value once set, the construction may be adapted for requiring input of an ID number for change of the value.

Further, in the foregoing embodiment, the sealing apparatus body 1 includes the fixed jaw mounted on the base and the movable jaw attached to the press levers pivotally mounted on the base. A modified sealing apparatus having a component carrying the movable jaw being mounted on the base to be displaceable in a different manner (e.g. a translational displacement) than the pivotal displacement is encompassed also within the scope of the present invention. The scope of the present invention will further encompass a further modified sealing apparatus including a pair of press members both of which are displaceable (pivotally displaceable, translationally displaceable, etc.) relative to the base and each of these movable press members includes a movable jaw.

In the foregoing embodiment, the heat-fusing sealing operation of the materials made of thermoplastic resin is effected by momentarily heating the materials with the nichrome heaters or the like. Alternatively, the heat-fusing sealing operation may be carried out by means of an ultrasonic fusing mechanism.

The data transfer means implemented in the sealing apparatus body 1 may be an infrared ray interface based on the IrDA1

Although the present invention has been described with reference to some particular embodiments, it is to be understood that these embodiments are merely illustrative of the application of the principles of the invention. Numerous modifications may be made therein and other arrangements may be devised without departing from the spirit and scope of the invention.

What is claimed is:

1. A sealing apparatus comprising:
   a base having a fixed jaw;
   a press lever pivotally supported on the base, the press lever having a movable jaw and being movable between a first state in which the movable jaw is located away from the fixed jaw to receive material to be sealed therebetween and a second state in which the movable jaw is moved toward the fixed jaw to clamp the material therebetween;
   a press mechanism for pressing the movable jaw against the fixed jaw by applying a stress to the press lever toward the base;
   means for heating the material pressed between the fixed jaw and the movable jaw by the press mechanism; and
   means for measuring the load applied between the fixed jaw and the movable jaw at any selected point in the course of transition from the first state to the second state, the load measuring means including a monitor portion mounted on the press lever to be deformable by the stress applied to the press lever from the press mechanism and means for determining the load based on the amount of the deformation of the monitor portion.

2. The sealing apparatus according to claim 1, wherein the monitor portion includes a pressure plate fixedly mounted on the press lever and a strain gauge affixed to the pressure plate; and the press mechanism draws the press lever via the pressure plate toward the base, so that the resulting load applied to the movable jaw causes corresponding deformation in the pressure plate, which deformation in turn applies a tensile or compressive force to the strain gauge.

3. The sealing apparatus according to claim 2, wherein said press mechanism includes a pressure transmitting member for pulling, via the pressure plate, the press lever toward the base.

4. The sealing apparatus according to claim 2, wherein the press lever includes a support portion for supporting the pressure plate and a gap is provided between the press lever and the pressure plate for allowing the deformation of the pressure plate.

5. The sealing apparatus according to claim 1, further comprising an emergency stop mechanism for stopping the change of the posture if the load measuring means detects a value of load exceeding a first predetermined load value during the transition from the first state to the second state.

6. The sealing apparatus according to claim 1, further comprising clamping-force judging mean for driving the heating means when the load measuring means detects a load value exceeding a second predetermined load value.

7. The sealing apparatus according to claim 1, further comprising a posture judging switch operable in response to switchover of the press lever to the second state.

8. The sealing apparatus according to claim 1, further comprising a temperature detecting means attached to at least one of the fixed jaw and movable jaw for detecting the temperature of the material and a cooling judging means for returning the press lever to the first state when the temperature detecting means detects a temperature below a predetermined temperature after the driving of the heating means is stopped.

9. The sealing apparatus according to claim 6, further comprising means for varying the second predetermined load value.

10. A sealing apparatus comprising:
a pair of jaws movable between a first state in which the jaws are located away from each other to receive material to be sealed therebetween and a second state in which the jaws are moved toward each other to clamp the material therebetween;
a press mechanism for pressing the jaws against each other;
means for heating the material pressed between the jaws by the press mechanism;
means capable of measuring the load applied to the pair of jaws in the course of transition from the first state to the second state; and
clamping-force judging means for driving the heating means when the load measuring means detects a value exceeding a second predetermined load value.

11. A sealing apparatus comprising:
a pair of jaws movable between a first state in which the jaws are located away from each other to receive an material to be sealed therebetween and a second state in which the jaws are moved toward each other to damp the material therebetween;
a press mechanism for pressing the jaws against each other;
means for heating the material pressed between the jaws by the press mechanism;
temperature detecting means attached to at least one of the pair of jaws for detecting the temperature of the material; and
cooling judging means for returning the pair of jaws to the first state when the temperature detecting means detects a temperature below a predetermined temperature after the driving of the heating means is stopped.

12. A sealing apparatus comprising:
a pair of jaws movable between a first state in which the jaws are located away from each other to receive an material to be sealed therebetween and a second state in which the jaws are moved toward each other to clamp the material therebetween;
a press mechanism for pressing the jaws against each other;
means for heating the material pressed between the jaws by the press mechanism;
means for measuring the load applied between the pair of jaws at any selected point in the course of transition from the first state to the second state; and
data transfer means for transferring the measured load value at the time of sealing.

13. The sealing apparatus according to claim 12, further comprising:
data processing means for processing the measured load value transferred from said data transfer means; and
outputting means for outputting the measured load value processed by said data transfer means as a sealing pressure applied to the material at the time of sealing thereof.

14. The sealing apparatus according to claim 13, wherein said outputting means prints the measured load value on the surface of the material used in the sealing.

15. The sealing apparatus according to claim 13, wherein said outputting means outputs a measured load value out of a predetermined permissible range in a different manner than a measured load value within said predetermined permissible range.

16. The sealing apparatus according to claim 15, wherein said outputting means prints the measured value out of the predetermined range in a different color than the measure load value within the predetermined permissible range.

17. The sealing apparatus according to claim 12, further comprising:
temperature detecting means attached to at least one of said pair of jaws for detecting the temperature of the material;
cooling judging means for returning the pair of jaws to the first state when the temperature detecting means detects a temperature below a predetermined temperature after the driving of the heating means is stopped; and
said outputting means outputs said detected temperature value at the time of returning the jaws, independently of the measured load value.

* * * * *